(12) United States Patent
Tang et al.

(10) Patent No.: US 10,274,975 B2
(45) Date of Patent: Apr. 30, 2019

(54) METHOD AND APPARATUS FOR CONTROLLING ACID CONCENTRATION FOR PICKLING IN COLD ROLLING

(71) Applicant: BAOSHAN IRON & STEEL CO., LTD., Shanghai (CN)

(72) Inventors: Anxiang Tang, Shanghai (CN); Lifeng Shen Tu, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 0 days.

(21) Appl. No.: 14/649,429

(22) PCT Filed: Nov. 30, 2012

(86) PCT No.: PCT/CN2012/001603
§ 371 (c)(1),
(2) Date: Jun. 3, 2015

(87) PCT Pub. No.: WO2014/082189
PCT Pub. Date: Jun. 5, 2014

(65) Prior Publication Data
US 2015/0316938 A1 Nov. 5, 2015

(51) Int. Cl.
*G05D 21/02* (2006.01)
*B21B 45/02* (2006.01)
(Continued)

(52) U.S. Cl.
CPC ......... *G05D 21/02* (2013.01); *B21B 45/0269* (2013.01); *C23G 1/02* (2013.01);
(Continued)

(58) Field of Classification Search
CPC .......... C10L 9/06; C10L 9/08; C10L 2290/58; C10L 2290/06; C10L 2230/14
See application file for complete search history.

(56) References Cited

U.S. PATENT DOCUMENTS 3,091,558 A * 5/1963 Shay ...................... C23G 3/021
118/663
5,347,446 A * 9/1994 Iino ...................... G05B 13/048
700/29
(Continued)

FOREIGN PATENT DOCUMENTS

| CN | 102286751 B | 10/2012 |
|---|---|---|
| CN | 102929303 A | 2/2013 |
| JP | 2007321174 A | 12/2007 |

*Primary Examiner* — Shogo Sasaki
(74) *Attorney, Agent, or Firm* — Eversheds Sutherland (US) LLP (57) ABSTRACT

The present invention discloses an acid concentration control method and device for cold rolling pickling production line. In the method, the acid circulating tank of the pickling production line are provided with three acid-filling tanks. And the three acid-filling tanks are interconnected with each other. An acid concentration measuring device is concatenated on the acid solution back-flow pipeline of each acid-filling tank and acid tank, through which the actual acid concentration of the acid solution in the acid tank of the production line may be measured. The measured acid concentration, after being analyzed by the analyzer, will be transmitted to the multi-variable controller where it is compared to the specified acid concentration as per process requirements. The difference between the measured acid concentration and the specified acid concentration will be used as the input value for the model of the multi-variable controller. As the acid concentrations of the three acid-filling tanks are affected by each other, the coupling relationship of the acid concentrations at the three measuring points must be found out to build the mathematical model for the acid circulating tank of the production line, and perform the multi-variable decoupling calculation. With the control method of the present invention, the close-loop control to the acid concentration can be achieved, thus to save the hydrochloric acid, reduce the regeneration amount of waste acid and decrease the environmental pollution.

3 Claims, 3 Drawing Sheets

(51) Int. Cl.

| | |
|---|---|
| *G05B 13/04* | (2006.01) |
| *G06F 17/16* | (2006.01) |
| *C23G 1/08* | (2006.01) |
| *C23G 3/02* | (2006.01) |
| *C23G 1/02* | (2006.01) |

(52) U.S. Cl.
CPC ............... *C23G 1/08* (2013.01); *C23G 3/02* (2013.01); *G05B 13/042* (2013.01); *G06F 17/16* (2013.01)

(56) References Cited

U.S. PATENT DOCUMENTS

| | | | | |
|---|---|---|---|---|
| 5,408,406 | A * | 4/1995 | Mathur | G05B 13/027 700/38 |
| 5,493,631 | A * | 2/1996 | Huang | G05B 13/027 706/23 |
| 5,822,740 | A * | 10/1998 | Haissig | F24D 19/1066 700/40 |
| 6,396,280 | B1 * | 5/2002 | Nonaka | C23G 1/02 324/425 |
| 6,532,454 | B1 * | 3/2003 | Werbos | G05B 13/027 706/14 |
| 2003/0094217 | A1 * | 5/2003 | Yazawa | C21D 8/0405 148/325 |
| 2010/0065167 | A1 * | 3/2010 | Dulcetti | C21D 9/52 148/634 |

\* cited by examiner

METHOD AND APPARATUS FOR CONTROLLING ACID CONCENTRATION FOR PICKLING IN COLD ROLLING

TECHNICAL FIELD

The present invention relates to an acid concentration control method and device for cold rolling pickling production line.

BACKGROUND TECHNOLOGY

In the production of cold-rolled strip steel, an important process is pickling. Pickling is a chemical process that chemically removes the iron oxide scale from the surface of metal. Iron oxide scales on the strip surface ($Fe_2O_3$, $Fe_3O_4$, FeO) are alkaline oxides insoluble in water. When they are immersed in acid, these alkaline oxides react with the acid chemically. The oxide scales on the surface of carbon steel or low alloy iron have the property of being loose, porous and with cracks. The cracks will be further enlarged if these oxide scales are straightened, withdrawn-straightened, and transmitted together along the strip steel. Therefore, the acid solution also reacts with the iron matrix of the large strip steel when reacting with the oxide scales. The purpose of pickling is to remove the oxide layer on the surface of the strip steel. Conventional pickling usually has the problem of having lag in acid concentration control, which makes it unable to achieve stable control of hydrochloric acid concentration. The hydrochloric acid concentration fluctuates greatly in the actual production process, resulting in unstable cleaning quality of strip steel, and pretty high usage of acid. This is a waste of hydrochloric acid. Currently, most of the existing pickling sets in the world utilize manual control of acid concentration. It is mainly because the accuracy of real-time measurement of acid concentration is difficult to be ensured, since there are no well-developed measurement and control schemes. Generally, the manual control of acid concentration is implemented such that sampling is carried out manually at regular time, the acid concentration of the sample is analyzed with titration, and the acid is compensated based on actual experiences. The biggest disadvantage of this method is the lag in control. Because the changing of actual acid concentration closely relates to many factors, such as the operating speed of the set, the width of the strip steel, oxidation level of the strip surface and the kind of the steel, etc., manual control method will inevitably cause great fluctuations of acid concentration, resulting in unstable cleaning quality of the strip steel.

Chinese Patent Publication No. CN1462321 discloses a continuous pickling method and a continuous pickling device. The continuous pickling method is that, in one hand, providing acid solution to more than two pickling tanks among several pickling tanks constituting the continuous pickling device, respectively; in the other hand, calculating the total supply amount of the acid with the thickness of oxide scale on the strip steel, the width of the said strip steel, and the conveying speed of the strip when pickling the conveyed strip, and obtaining the distribution proportion of the respective supply amount of the acid to the said more than two pickling tanks with the pickling mode of the said strip and the conveying speed of the strip steel. The pickling line control device predicts the consumed amount of acid stored in the third tank and the final tank of the continuous pickling device during pickling to determine the supply amount of the pickling solution to the third tank and the final tank, respectively, so that the acid is supplied to the acid supply system. The acid concentration measuring device continuously measures the acid concentration of the pickling solutions stored respectively in the third tank and the final tank. The acid supply system supplies the acid to the third tank and the final tank according to the acid concentration values measured continuously, so that the acid concentrations stored in the third tank and the final tank match with respective target value, respectively. This makes the limited acid concentration discharged from the final tank increase to 12%, while makes the acid concentrations of the pickling solutions stored in other pickling tanks increase.

Chinese Patent Publication No. CN1280633 discloses a continuous acid concentration measuring device, wherein it consists a body device that can make the acid pickling solution flow through the channel continuously in one direction, a densitometer, a thermometer and a conductivity meter provided in the body device and actually used to measure the acid pickling solution continuously flowing through the channel, and a calculator used to calculate the concentration of the acid pickling solution according to these measured results. Using this type of acid concentration continuous measuring device can feedback and control the hydrochloric acid concentration in the final acid pickling tank among several acid pickling tanks constituting the continuous acid pickling equipment.

In the disclosed literature mentioned above, it relates to an acid concentration measuring device. The adopted measuring method relates to the temperature measuring, density measuring and conductivity measuring, and to reckoning the acid concentration with the temperature, density, and conductivity. The single-variable acid concentration control method is used. The overall measurement costs a pretty long time, about 1 h. It is an intermittent measuring method. Due to the lag of the acid concentration control, it is impossible to achieve the stable control on the concentration of hydrochloric acid. In the practical production process, the concentration of hydrochloric acid has a large fluctuation, resulting in the instability of the strip cleaning quality. In addition, the consumption of the acid is too large, resulting in a waste of hydrochloric acid.

SUMMARY OF THE INVENTION

The purpose of the present invention is to provide an acid concentration control method and device for cold rolling pickling production line. In the invention, the multi-variable decoupling control method is applied to achieve the close-loop control of acid concentration, thus saving the usage amount of the hydrochloric acid, decreasing the regenerated amount of waste acid, and reducing the environmental pollution.

To achieve the above purpose, the present invention adopts the following technical scheme:

An acid concentration control method for pickling in a cold rolling, comprising:

providing three acid-filling tanks which are interconnected with each other on an acid circulating tank of a pickling production line;

concatenating an acid concentration measuring device to an acid solution back-flow pipeline between each acid-filling tank and the acid circulating tank;

obtaining an actual acid concentration of acid solution in the acid tank of a production line by the acid concentration measuring device;

analyzing the actual acid concentration by an analyzer and feedbacking to a multi-variable controller;

comparing the actual acid concentration, in the multi-variable controller, with a specific acid concentration required by a processing, and setting a difference between the actual acid concentration and the specific acid concentration as an input value for a model of the multi-variable controller;

as the acid concentrations of the three acid-filling tanks are affected by each other, coupling relationship of the acid concentrations at three measuring points must be found out to build a mathematical model for the acid circulating tank of the production line, and perform multi-variable decoupling calculation so that multi-variable control system is converted into single-variable control system, wherein specific steps are as follows:

Step 1 setting a multi-variable mathematical model for the acid circulating tank of a controlled object in the pickling production line, wherein a formula of a transfer function matrix G(s) for the acid-filling tank of the controlled object in the pickling production line is:

$$G(s) = \frac{1}{(a_1 a_2 a_3 s + a_3 \beta_1 (a_1 + a_2))s^2 + (\beta_2 + \beta_3)(a_1 a_2 s + \beta_1 (a_1 + a_2))s} G^{-1}(s) \quad (7)$$

and a formula of an inverse function $G^{-1}(s)$ of the transfer function matrix G(s) for the acid-filling tank is:

$$G^{-1}(s) = \begin{pmatrix} a_1 s + \beta_1 & -\beta_1 & 0 \\ -\beta_1 & a_2 s + \beta_1 + \beta_2 & -\beta_2 \\ 0 & -\beta_2 & a_3 s + \beta_2 + \beta_3 \end{pmatrix} \quad (6)$$

wherein:

$a_1$, $a_2$, $a_3$ are respectively the sectional areas of the three acid-filling tanks, and the three acid-filling tanks have a same volume; $\beta_1$, $\beta_2$, $\beta_3$ are allowable deviations of acid-filling amount;

Step 2 designing a transfer function matrix $K_p(s)$ for a pre-compensator based on the transfer function matrix G(s) for the acid-filling tank obtained in Step 1, to make $K_p(s)$ and G(s) become the diagonally dominant matrix, wherein a specific method is as below:

1) operating an existing software of plotting Gussie-Collins belt of the transfer function G(s), inputting the transfer function G(s) into a pop-up interface, and clicking an operation after completion of input, then obtaining a Nyquist plot attached with Gussie-Collins belt displayed on the interface, in which $K_p(s)$ and G(s) become diagonally dominant matrix;

2) calculating the transfer function matrix $K_p(s)$ for a pre-compensator by using an existing diagonal dominance software; plotting a Gussie-Collins belt of Q(s) and then reaching a diagonal dominance for an open-loop system compensated;

Step 3 designing a single-loop compensation for the transfer function matrix G(s) of the acid-filling tank; since Q(s) has reached the diagonal dominance, applying a single-variable design method to complete a compensation design for three single loops, taking $K_{ci}$(i=1, 2, 3) as PI adjuster and obtaining value of transfer function matrix $K_c(s)$ of dynamic compensator through several times of trial and errors;

Step 4 plotting a Nyquist plot attached with Gussie-Collins belt for $G(s)K_c(s)K_p(s)$, ensuring close-loop system to be stable according to a Nyquist stability criterion and obtaining a feedback gain value F(s) of the acid concentration.

In the Step 1, values of the sectional areas of the three acid-filling tanks are: $a_1=a_2=a_3=1.8$ m$^2$, and the deviation values of acid-filling amount allowed in process are: $\beta_1=0.6$; $\beta_2=0.5$; $\beta_3=0.36$; after applying them into Formula (7), then the transfer function matrix G(s) of the acid-filling tank is:

$$G^{-1}(s) = \begin{bmatrix} 1.8s + 0.6 & -0.6 & 0 \\ -0.6 & 1.8s + 1.1 & -0.5 \\ 0 & -0.5 & 1.8s + 0.86 \end{bmatrix} \quad (8)$$

$$G(s) = \frac{1}{(5.832s + 3.88)s^2 + (2.78s + 1.856)s}$$

$$\begin{bmatrix} 1.8s + 0.6 & -0.6 & 0 \\ -0.6 & 1.8s + 1.1 & -0.5 \\ 0 & -0.5 & 1.8s + 0.86 \end{bmatrix}$$

Step 2 calculate the transfer function matrix $K_p(s)$ of the pre-compensator:

$$K_p = \begin{pmatrix} -82.0325 & 67.2212 & 0 \\ 66.3421 & -18.2674 & 55.9562 \\ 0 & 57.3965 & -17.5638 \end{pmatrix} \quad (9)$$

Step 3 through several times of trial and errors, the following is obtained:

$$K_c(s) = \text{diag}\left[ 1 + \frac{0.0078}{s} \quad 1 + \frac{0.0021}{s} \quad 1 + \frac{0.0038}{s} \right] \quad (10)$$

Step 4 the feedback gain value F(s) of the acid concentration is obtained as:

$f_1=(0.82); f_2=(0.78); f_3=(0.89)$.

In the Step 4, the feedback gain value F(s) of the acid concentration is:

$F(s) = \text{diag}[1.5\ 1.5\ 1.5]$. (11)

Step 5 adjust the feedback gain value F(s) of the acid concentration, and use it as a step imitation curve of the close-loop system, adjust the feedback gain value F(s) of the acid concentration to complete design of multi-variable close-loop control system.

Step 6 simulate the close-loop control system, a unit step response curve of the system can be obtained through existing simulation software, adjust system parameters, including input parameter setting values, the transfer function matrix $K_p(s)$ of the pre-compensator, the transfer function matrix $K_c(s)$ of the dynamic compensator and the feedback gain value F(s) of the acid concentration so that there is no overshoot in each main channel, meeting steady state error and response speed requirements of the system.

An acid concentration control device for cold rolling pickling production line includes an acid concentration analyzer, sensor, instrument setting and display system, controller and actuator, wherein: the sensor includes a conductivity sensor and a temperature sensor, the conductivity sensor is used to measure conductivity of solution at an outlet of acid circulating tank of the production line, and the temperature sensor is used to measure temperature of the solution at the outlet of the acid circulating tank of the production line, signals of the temperature sensor and the conductivity sensor are output to the acid concentration analyzer, the acid concentration analyzer calculates concentration of the solution in the acid circulating tank and sends it to the controller;

the controller is a multi-variable controller, including a dynamic compensation controller and a pre-compensation controller, the multi-variable controller can perform multi-variable decoupling calculation according to an input acid concentration signal setting value and an actual acid concentration value measured by the sensor, calculated control variable is output to the actuator;

the actuator controls a liquid feeding pump and a liquid feeding valves on each acid-filling tank, the acid-filling tanks are interconnected with each other, controlling acid concentration of acid solution fed into the acid circulating tank.

Three acid-filling tanks are provided, and the three acid-filling tanks are respectively positioned at inlet, outlet and the middle of the acid circulating tank where a steel strip goes through.

The present invention directly calculates the acid concentration by real-time measuring electrical conductivity and temperature of the acid circulating tank of the picking production line in cold rolling, and achieves close-loop control and optimization of acid concentration by utilizing a multi-variable decoupling controller model, so as to save hydrochloric acid usage amount, reduce the amount of regenerated waste acid, and reduce environmental pollution.

The acid concentration control device for cold rolling pickling production line in the present invention uses a multi-variable controller to achieve continuous measurement without interruption, which can achieve automatic continuous control. The configuration of the device is simply, while the acid concentrations control of the acid circulating tank stable, so that not only the quality of the strip pickling is ensured, but also the usage amount of acid is saved.

In figures: 11-117 valves, 21-23 heaters, 31-311 flowmeters, 41-411 pumps, 5, 51-53 acid-filling tanks; 1 roller, 2 acid sprayer, 3 overflow pipe, 4 strip steel; 6 sensor (acid concentration measuring device), 7 acid concentration analyzer, 8 actuator, 9 pre-compensation controller, 10 dynamic compensation controller, 100 production line acid circulating tank (acid tank, pickling tank).

DESCRIPTION OF THE PREFERRED EMBODIMENTS

Next, drawings and preferred embodiments are combined to further explain the present invention.

Figure 1:
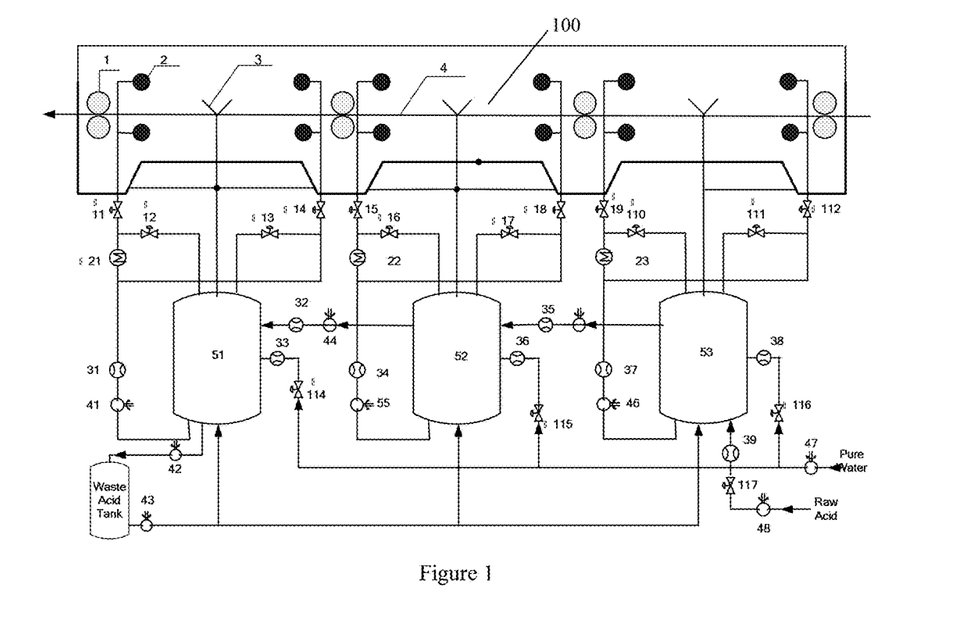
FIG. 1 shows the schematic diagram of concentration control process for cold rolling pickling production line.
Figure 2:
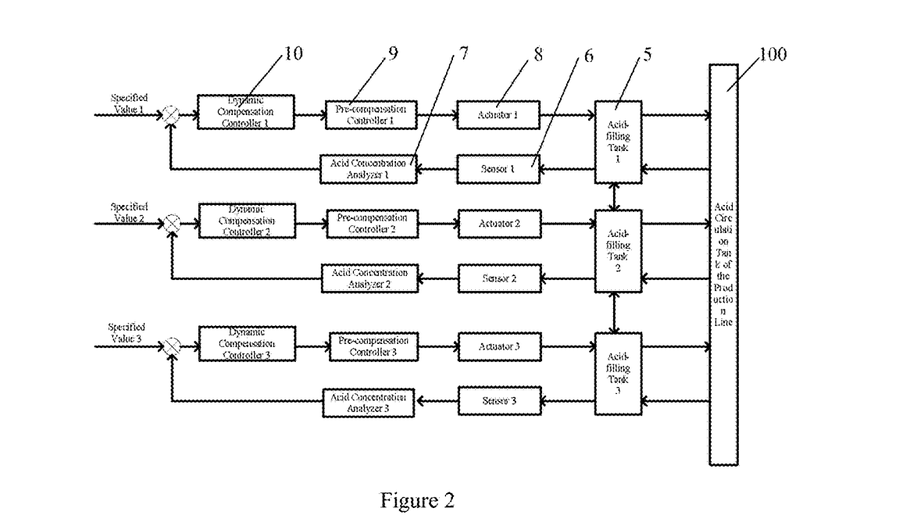
FIG. 2 shows the schematic diagram of the concentration control device for cold rolling pickling production line in the present invention.

As shown in FIGS. 1 and 2, the concentration control device for cold rolling pickling production line includes acid concentration analyzer 7, sensors 6, instrument setting and display system, multi-variable controller, and actuator 8; sensors 6 includes an electric conductivity sensor and a temperature sensor. The conductivity sensor measures the solution conductivity at the outlet of acid circulating tank 100 (referred to as the acid tank), and the temperature sensor measures the temperature of the acid solution at the outlet of the acid tank. The signals of the temperature sensor and conductivity sensor are output to acid concentration analyzer 7; and acid concentration analyzer 7 analyzes and calculates the concentration of the solution in acid tank 100. The concentration is fed to the multi-variable controller, which includes a dynamic compensation controller 10 and a pre-compensation controller 9. The production operator can set the parameters of multi-variable controller through the instrument setting and display system. The multi-variable controller implements multi-variable decoupling calculations according to the acid concentration signal input by the operator and the actual value of the acid concentration measured by the sensors, and outputs the calculated control variables to actuator 8; actuator 8 controls the liquid feed pumps and valves on each one of the acid-filling tanks 5 that are interconnected with each other to control the acid concentration of the acid to be transported in acid circulating tank 100.

Figure 4:
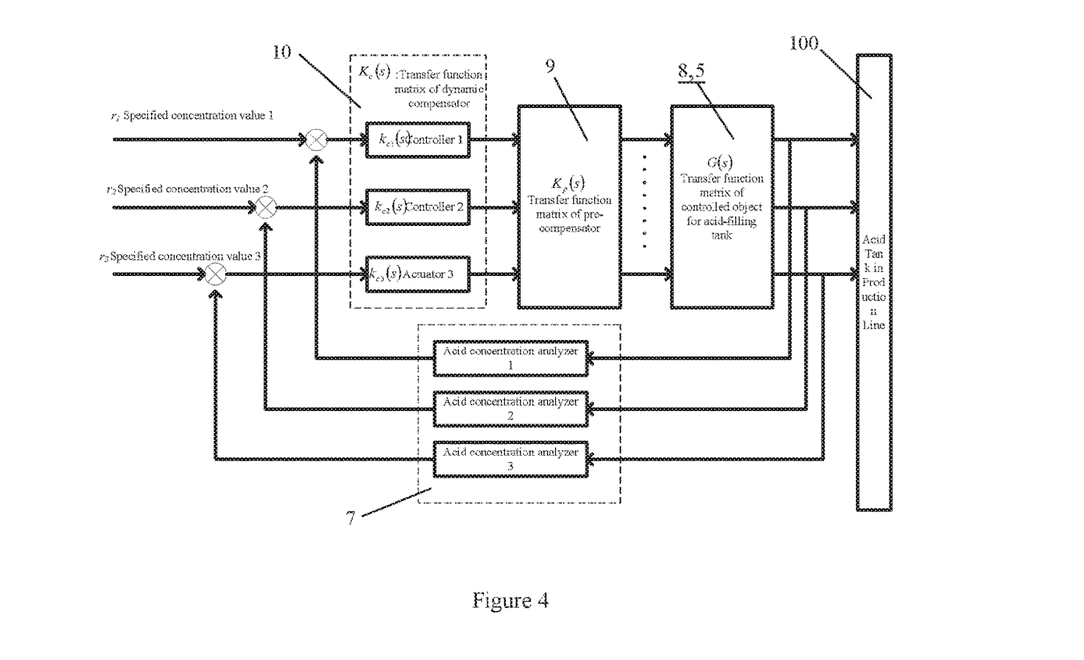
FIG. 4 shows the schematic diagram of the acid concentration multi-variable controller in the present invention.

As shown in FIG. 1, in the cold rolling pickling production line, the device typically controls the acid concentrations at three points of acid circulating tank 100 in the production line to ensure that the concentration of the solution in the acid tank of the whole production line meets the requirements of the production process. Therefore, three acid-filling tanks 51, 52 and 53 are provided in the pickling production line; an acid concentration measuring device 6 (i.e. sensors) is connected in series in the pipe (i.e. overflow pipe 3) for reflux of acid solution between each one of the acid-filling tanks 51, 52, and 53 and the pickling tank 100 in the production line; this acid concentration measuring device 6 is used to measure the actual acid concentration value of the internal acid solution in acid tank 100 in the production line which is fed to the multi-variable controller after acid concentration analyzer 7. The controller compares this value with the concentration value given by the process. This difference is taken as the input value to the controller model. The measuring points are usually chosen as the positions at the inlet where the strip steel 4 enters the pickling tank 100, outlet, and middle of pickling tank. Since strip steel 4 enters pickling tank 100 from the inlet, and exits from the outlet at a certain speed, the acid solution inside acid tank 100 flows from inlet to outlet. Three acid-filling tanks 51, 52, and 53 are interconnected with each other; the raw acid flows into No. 3 acid-filling tank 53, flows into the inlet of acid tank 100 and No. 2 acid-filling tank 52 respectively after being diluted in No. 3 acid-filling tank 53, flows into the middle position of acid tank 100 and No. 1 acid-filling tank 51 respectively after being diluted in No. 2 acid-filling tank 52 again, and flows into pickling acid tank 100 and the waste acid tank respectively after being diluted in No. 1 acid-filling tank 51 again. Therefore, the acid concentrations in three acid-adding tanks 51, 52, and 53 are mutually interacted, namely, the measured acid concentration values are associated with each other, indicating that the acid concentration controller is a multi-variable controller, as shown in FIG. 4.

In order to precisely control the acid concentration inside the acid circulating tank 100 in the production line, this invention establishes a mathematical model of the acid circulating tank in the production line by finding out the coupling relationship between the acid concentrations of three measurement points, and implements multi-variable decoupling calculations to convert the multi-variable control system into a single-variable control system. In order to establish the mathematical model, the present invention combines the flow diagram of cold rolling pickling acid concentration control process in FIG. 1 with the schematic diagram of the concentration control device for cold rolling pickling production line in FIG. 2, makes them equivalent to the modeling schematic diagram of the acid concentration multi-variable controller in FIG. 3. The mathematical model G(s) of the controlled objects is obtained based on FIG. 3. G(s) is used to design the multi-variable controller. The Nyquist array method is used during the designing of the multi-variable controller. Its basic design idea is: first introduce a pre-compensator $K_p(s)$ before the controlled objects to weaken the coupling effect between each loop, thus making the system's open-loop transfer function matrix become diagonal dominance matrix, and simplifying the design of the entire multi-variable system to a compensation design of a group of single-variable system; secondly design a dynamic compensator $K_c(s)$ using the single-variable design method. As shown in FIG. 4, FIG. 4 is a schematic diagram of the acid concentration multi-variable controller. After being calculated and processed by the multi-variable controller, the calculated control variables are output to the actuator, and the actuator controls the liquid feed pumps and the valves on each acid-filling tank respectively so as to control the acid concentrations of the acid circulating tank.

Figure 3:
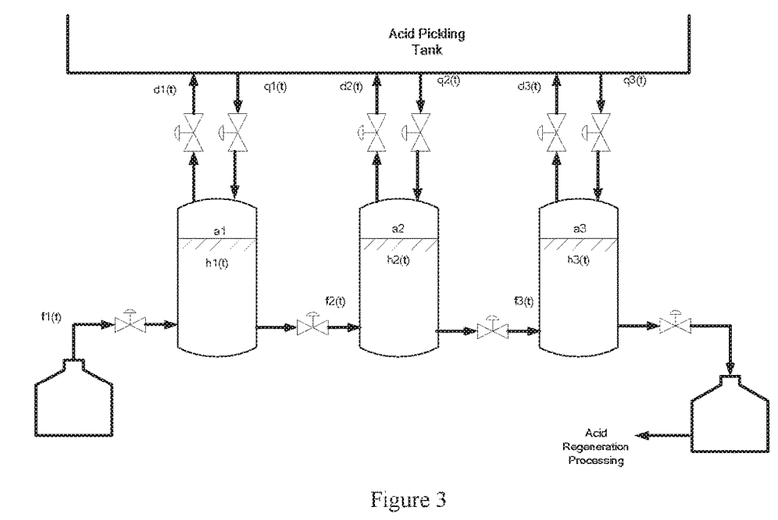
FIG. 3 shows the schematic diagram of modeling of the acid concentration multi-variable controller in the present invention.

A cold rolling pickling acid concentration control method comprises the following steps:

Step 1: build a multi-variable mathematical model of the controlled object (i.e., the acid tank) in the pickling line As shown in FIG. 3. FIG. 3 is a schematic diagram of modeling of the acid concentration multi-variable controller, wherein:

$a_i$ is the sectional area of the $i^{th}$ acid-filling tank. The cross-sectional area of acid-filling tank is known as uniform;

$h_i(t)$ is the liquid level of the $i^{th}$ acid-filling tank at time t;

$f_i(t)$ is the flow from the $i^{th}$ acid-filling tank to the $(i+1)^{th}$ acid-filling tank i+1 at time t;

$d_i(t)$ is the flow of the liquid output from the $i^{th}$ acid-filling tank at time t; and $q_i(t)$ is the flow of liquid input to the $i^{th}$ acid-filling tank at time t;

It is assumed that the velocity $q_i(t)(1 \le i \le m)$ of the flow into the acid-filling tank is taken as the input value of the system;

the liquid level $h_i(t)(1 \le i \le m)$ of the acid-filling tank is taken as the output value of the system;

the flow $d_i(t)(1 \le i \le m)$ of the liquid output from the acid-filling tank is taken as the amount of external disturbance of the system.

Thus, based on the basic laws of physics, it can be deduced that the general expression of the differential equation that describes the system is as follows:

$$a_i \dot{h}_i(t) = q_i(t) - d_i(t) - f_i(t) + f_{i-1}(t)(1 \le i \le m) \quad (1)$$

wherein:

$$f_0(t) = f_m(t) = 0$$

it is assumed that $$h_i(t) = h_{i0} + x_i(t)(1 \le i \le m)$$

$$q_i(t) = q_{i0} + u_i(t)(1 \le i \le m)$$

$$d_i(t) = d_{i0} + l_i(t)(1 \le i \le m)$$

$$f_i(t) = f_{i0} + \beta_i[x_i(t) - x_{i+1}(t)](1 \le i \le m)$$

wherein:

$h_{i0}$, $q_{i0}$, $d_{i0}$, and $f_{i0}$ are the rated steady-state values of $h_i(t)$, $q_i(t)$, $d_i(t)$, and $f_i(t)$, respectively;

$x_i(t)$, $u_i(t)$, $l_i(t)$, and $\beta[x_i(t) - x_{i-1}(t)]$, are the change amounts of $h_i(t)$, $q_i(t)$, $d_i(t)$ and $f_i(t)$ relative to the rated steady-state values, respectively; $\beta_i > 0$, $(1 \le i \le m)$;

Thus, it can be obtained that the differential equation with smaller deviation relative to the rated steady state values is as follows:

$$a_1 \dot{x}_1(t) = u_1(t) - l_1(t) - \beta_1[x_1(t) - x_2(t)] \quad (2)$$

$$a_i \dot{x}_i(t) = u_i(t) - l_i(t) - \beta_i[x_i(t) - x_{i+1}(t)] + \beta_{i-1}[x_{i-1}(t) - x_i(t)]$$
$$(2 \le i \le m-1)$$

$$a_m \dot{x}_m(t) = u_m(t) - l_m(t) + \beta_{m-1}[x_{m-1}(t) - x_m(t)]$$

For convenience, it is assumed that the disturbance $l_i(t)$ $(1 \le i \le m)$ equals to zero. The differential equation with small deviation relative to the rated steady state values can be expressed as:

$$\begin{cases} \dot{x}(t) = Ax(t) + Bu(t) \\ y(t) = Cx(t) \end{cases} \quad (3)$$

wherein:

$$A = \begin{bmatrix} -\frac{\beta_1}{a_1} & \frac{\beta_1}{a_1} & 0 & 0 & \cdots & \cdots & 0 \\ \frac{\beta_1}{a_2} & \frac{-(\beta_1+\beta_2)}{a_2} & \frac{\beta_2}{a_2} & 0 & \cdots & \cdots & \\ 0 & \frac{\beta_2}{a_3} & \frac{-(\beta_2+\beta_3)}{a_3} & \frac{\beta_3}{a_3} & \cdots & \cdots & \\ \cdots & \cdots & \cdots & \cdots & \cdots & \cdots & \\ \cdots & \cdots & \cdots & \cdots & \cdots & \cdots & 0 \\ 0 & 0 & \cdots & \cdots & \frac{\beta_{m-1}}{a_m} & \frac{-\beta_{m-1}}{a_m} \end{bmatrix}$$

$$B = \begin{bmatrix} \frac{1}{a_1} & 0 & 0 & \cdots & 0 \\ 0 & \frac{1}{a_2} & 0 & \cdots & 0 \\ 0 & 0 & \frac{1}{a_3} & \cdots & 0 \\ \cdots & \cdots & \cdots & \cdots & \cdots \\ 0 & 0 & 0 & \cdots & \frac{1}{a_m} \end{bmatrix}$$

$$C = \begin{bmatrix} 1 & & & 0 \\ & 1 & & \\ & & \ddots & \\ 0 & & & 1 \end{bmatrix}$$

$$x(t) = [x_1(t) x_2(t) \ldots x_m(t)]^T$$
$$y(t) = [y_1(t) y_2(t) \ldots y_m(t)]^T$$
$$u(t) = [u_1(t) u(t) \ldots u_{m(t)}]^T$$

The system's transfer function matrix is:

$$G(s) = C[sI - A]^{-1} B \quad (4)$$

Its inverse function is:

$$G^{-1}(s)=B^{-1}[sI-A]C^{-1} \quad (5)$$

wherein:

$$B^{-1} = \begin{pmatrix} a_1 & & & 0 \\ & a_2 & & \\ & & \ddots & \\ 0 & & & a_m \end{pmatrix}$$

Apply $B^{-1}$, A and $C^{-1}$ into Formula (5) to obtain the general expression:

$$G^{-1}(s) = \begin{pmatrix} a_1s+\beta_1 & -\beta_1 & 0 & 0 & \cdots & 0 \\ -\beta_1 & a_2s+\beta_1+\beta_2 & -\beta_2 & 0 & \cdots & \cdots \\ 0 & -\beta_2 & a_3s+\beta_2+\beta_3 & -\beta_3 & \cdots & \cdots \\ 0 & 0 & -\beta_3 & a_4s+\beta_3+\beta_4 & \cdots & \cdots \\ \cdots & \cdots & \cdots & \cdots & \cdots & -\beta_{m-1} \\ 0 & \cdots & \cdots & \cdots & -\beta_{m-1} & a_ms+\beta_{m-1} \end{pmatrix} \quad (6)$$

$G^{-1}(s)$ describes the dynamic characteristics of the open-loop system of the acid-filling tank.

When m=3:

$$G^{-1}(s) = \begin{pmatrix} a_1s+\beta_1 & -\beta_1 & 0 \\ -\beta_1 & a_2s+\beta_1+\beta_2 & -\beta_2 \\ 0 & -\beta_2 & a_3s+\beta_2+\beta_3 \end{pmatrix}$$

it can be obtained that the transfer function of the acid-filling tank is as follows:

$$G(s) = \frac{1}{(a_1a_2a_3s+a_3\beta_1(a_1+a_2))s^2 + (\beta_2+\beta_3)(a_1a_2s+\beta_1(a_1+a_2))s} G^{-1}(s) \quad (7)$$

wherein: $a_1$, $a_2$, $a_3$ are cross-sectional areas of three acid-filling tanks The three acid adding volumes are the same. $a_1=a_2=a_3=1.8$ m$^2$. $\beta_1=0.6$; $\beta_2=0.5$; $\beta_3=0.36$ are the deviation amount values of the acid adding flow allowed by the process. Apply them into Formula (7), and then $$G^{-1}(s) = \begin{bmatrix} 1.8s+0.6 & -0.6 & 0 \\ -0.6 & 1.8s+1.1 & -0.5 \\ 0 & -0.5 & 1.8s+0.86 \end{bmatrix} \quad (8)$$

$$G(s) = \frac{1}{(5.832s+3.88)s^2 + (2.78s+1.856)s} \begin{bmatrix} 1.8s+0.6 & -0.6 & 0 \\ -0.6 & 1.8s+1.1 & 0 \\ 0 & -0.5 & 1.8s+0.86 \end{bmatrix}$$

Figure 5:
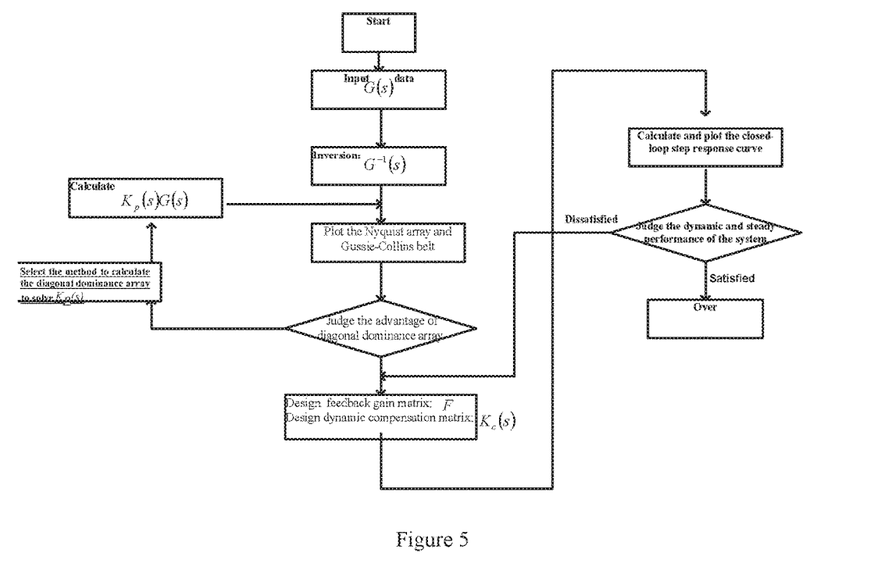
FIG. 5 shows the schematic diagram of the design process of the Nyquist array method in the present invention.

Step 2: design a transfer function matrix $K_p(s)$ for a pre-compensator based on the transfer function matrix $G(s)$ for the acid-filling tank obtained in Step 1, to make $K_p(s)$ and $G(s)$ become the diagonally dominant matrix. As shown in FIGS. 4 and 5. FIG. 4 is a schematic diagram of the acid concentration multi-variable controller. FIG. 5 is a schematic diagram of the design process of the Nyquist array method. The step is as follows:

1) operate existing software (which is available in the software market, is an existing technology) to plot Gussie-Collins belt of the transfer function G(s), input the mathematical model G(s) into a pop-up interface, and click to operation after completion of input, a Nyquist plot attached with Gussie-Collins belt is displayed on the interface, in which $K_p(s)$ and G(s) become diagonally dominant matrix;
2) calculate the transfer function matrix $K_p(s)$ for a pre-compensator using existing diagonal dominance software (which is available in the software market, is an existing technology):

$$K_p = \begin{pmatrix} -82.0325 & 67.2212 & 0 \\ 66.3421 & -18.2674 & 55.9562 \\ 0 & 57.3965 & -17.5638 \end{pmatrix} \quad (9)$$

plot Gussie-Collins belt of $K_p(s)$ G(s) and then an open-loop system compensated has reached diagonal dominance;

Step 3: design of single-loop compensation for G(s), since $K_p(s)$ G(s) has reached the diagonal dominance, a single-variable design method may be used to complete compensation design for three single loops. According to the requirements of production process, the overshoot of acid concentration should be small, the transient response procedure should be short, and the close-loop steady-state error should be zero. Therefore, take $K_{ci}$(i=1,2,3) as PI adjuster. Through several parameter trials, obtain that:

$$K_c(s) = \text{diag}\left[ 1+\frac{0.0078}{s} \quad 1+\frac{0.0021}{s} \quad 1+\frac{0.0038}{s} \right] \quad (10)$$

Step 4: plot Nyquist plot attached with Gussie-Collins belt for $G(s)K_c(s)K_p(s)$, ensure close-loop system to be stable according to Nyquist stability criterion and obtain feedback gain value F(s) of the acid concentration as $$F(s)=\text{diag}[1.5\ 1.5\ 1.5]. \quad (11)$$

Figure 6:
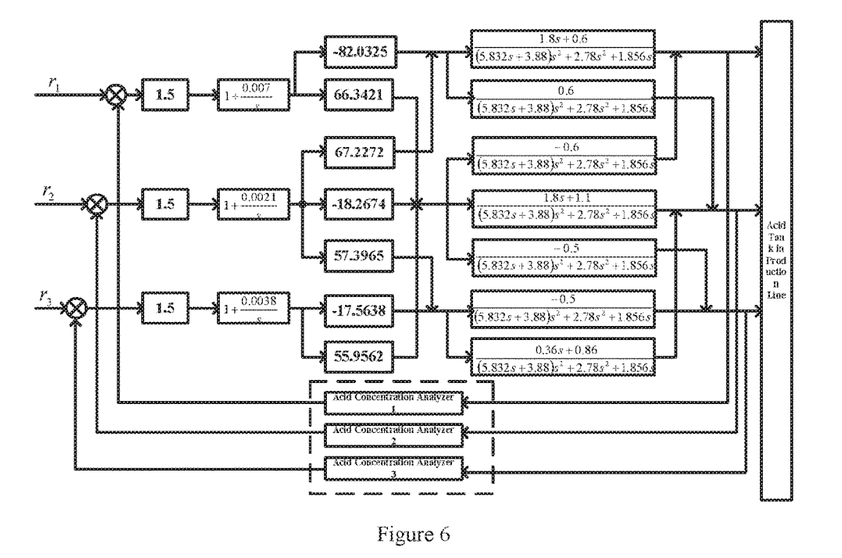
FIG. 6 shows a system block diagram of the acid concentration multi-variable close-loop controller in the present invention.

Step 5: adjust the feedback gain value F(s) of the acid concentration, and use it as a step imitation curve of the close-loop system, adjust the feedback gain value F(s) of the acid concentration to complete design of multi-variable close-loop control system. Upon completion of the close-loop control system, the block diagram is shown in FIG. 6.

Step 6: simulate the close-loop control system, a unit step response curve of the system can be obtained through existing simulation software, adjust system parameters, including input parameter setting values, the transfer function matrix $K_p(s)$ of the pre-compensator, the transfer function matrix $K_c(s)$ of the dynamic compensator and the feedback gain value F(s) of the acid concentration so that there is no overshoot in each main channel, meeting steady state error and response speed requirements of the system.

The main inventive ideas of the cold rolling pickling acid concentration control method of the present invention focus on the determining of various parameters in the acid concentration multi-variable controller model. The parameters include the transfer function matrix G(s) of the acid-filling tanks (the controlled objects), transfer function matrix $K_p(s)$ of pre-compensator, transfer function matrix $K_c(s)$ of dynamic compensator and feedback gain F(s) of acid concentration. The block diagram of the closed-loop control system after the parameters of the multi-variable controller arithmetic unit and the acid concentration multi-variable controller are determined is as shown in FIG. 6.

The actual values of acid concentration of the acid solution inside the acid tank of the production line are obtained through three acid concentration measuring devices, and fed to the multi-variable controller through the acid concentration analyzer. The multi-variable controller compares the actual values with the acid concentration values given by the process. The differences are taken as the input values of the multi-variable controller model; after being calculated and processed by the multi-variable controller, the control variables are calculated and output to the actuator. The actuator controls the liquid feed pumps and the valves on each oen of the acid-filling tanks respectively, so as to control the acid concentrations of the acid circulating tank.

Provided above are only preferred embodiments of the present invention, which is in no way used to limit the scope of protection of the present invention. Thus, any modification, equivalent substitution, improvement or other changes made in the spirit and principle of the present invention shall fall within the scope of protection of the present invention.

The invention claimed is:

1. An acid concentration control method for pickling a steel strip in a cold rolling process, comprising:
    providing three acid-filling tanks which are interconnected with each other and with an acid circulating tank of a pickling production line;
    concatenating three acid concentration measuring devices to three acid solution back-flow pipelines between each of the three interconnected acid-filling tanks and the acid circulating tank such that one acid concentration measuring device is concatenated to one respective acid solution back-flow pipeline;
    obtaining a respective actual acid concentration of acid solution in the acid circulating tank by each of the three acid concentration measuring devices;
    analyzing the actual acid concentrations by an analyzer and feedbacking to a multi-variable controller;
    comparing the actual acid concentrations, by the multi-variable controller, with a specific acid concentration, and setting a difference between the actual acid concentrations and the specific acid concentration as an input value for a model of the multi-variable controller;
    performing, via the multi-variable controller, a multi-variable decoupling calculation to convert a multi-variable control system into a single-variable control system;
    adjusting, based on the multi-variable decoupling calculation, an actuator to control a liquid feed into each of the three acid-filling tanks; and
    processing a steel strip by introducing the steel strip into the acid circulating tank for pickling during the cold rolling process;
    wherein the multi-variable controller performs the following steps:

Step 1, implementing a multi-variable mathematical model for the acid circulating tank, wherein a formula of a transfer function matrix G(s) for the three acid-filling tanks comprises:

$$G(s) = \frac{1}{(a_1 a_2 a_3 s + a_3 \beta_1 (a_1 + a_2))s^2 + (\beta_2 + \beta_3)(a_1 a_2 s + \beta_1 (a_1 + a_2))s} G^{-1}(s)$$

and a formula of an inverse function $G^{-1}(s)$ of the transfer function matrix G(s) for the three acid-filling tanks comprises:

$$G^{-1}(s) = \begin{pmatrix} a_1 s + \beta_1 & -\beta_1 & 0 \\ -\beta_1 & a_2 s + \beta_1 + \beta_2 & -\beta_2 \\ 0 & -\beta_2 & a_3 s + \beta_2 + \beta_3 \end{pmatrix}$$

wherein $a_1$, $a_2$, $a_3$ are respectively the cross-sectional areas of the three acid-filling tanks, and the three acid-filling tanks have a same volume; and $\beta_1$, $\beta_2$, $\beta_3$ are allowable deviations of acid-filling amount;

Step 2, implementing a transfer function matrix $K_p(s)$ for a pre-compensator based on the transfer function matrix G(s) obtained in Step 1, such that $K_p(s)$ G(s) comprises a diagonally dominant matrix, including:
    plotting a Gussie-Collins belt of the transfer function G(s), implementing the transfer function G(s), and obtaining a Nyquist plot with the Gussie-Collins belt, in which $K_p(s)$ G(s) comprises a diagonally dominant matrix; and
    calculating the transfer function matrix $K_p(s)$ for the pre-compensator, plotting a Gussie-Collins belt of Q(s), and reaching a diagonal dominance for an open-loop system compensated;

Step 3, implementing a single-loop compensation for the transfer function matrix G(s) of the three acid-filling tanks, applying a single-variable design method to complete a compensation design for three single loops, taking $K_{ci}$(i=1,2,3) as a PI adjuster, and obtaining a value of a transfer function matrix $K_c(s)$ of a dynamic compensator; and Step 4, implementing a Nyquist plot attached with a Gussie-Collins belt for $G(s)K_c(s)K_p(s)$, ensuring a close-loop system to be stable according to a Nyquist stability criterion and obtaining a feedback gain value F(s) of the acid concentration; and
    wherein the cross-sectional areas of the three acid-filling tanks are $a_1 = a_2 = a_3 = 1.8$ m², the allowable deviations of acid-filling amounts are $\beta_1 = 0.6$; $\beta_2 = 0.5$; $\beta_3 = 0.36$, the transfer function matrix G(s) comprises:

$$G(s) = \frac{1}{(5.832s + 3.88)s^2 + (2.78s + 1.856)s} \begin{bmatrix} 1.8s + 0.6 & -0.6 & 0 \\ -0.6 & 1.8s + 1.1 & -0.5 \\ 0 & -0.5 & 1.8s + 0.86 \end{bmatrix}$$

wherein the inverse function $G^{-1}(s)$ comprises:

$$G^{-1}(s) = \begin{bmatrix} 1.8s + 0.6 & -0.6 & 0 \\ -0.6 & 1.8s + 1.1 & -0.5 \\ 0 & -0.5 & 1.8s + 0.86 \end{bmatrix}$$

wherein the transfer function matrix $K_p(s)$ of the pre-compensator is calculated as:

$$K_p = \begin{pmatrix} -82.0325 & 67.2212 & 0 \\ 66.3421 & -18.2674 & 55.9562 \\ 0 & 57.3965 & -17.5638 \end{pmatrix}$$

wherein the transfer function matrix $K_c(s)$ of the dynamic compensator comprises:

$$K_c(s) = \text{diag}\left[ 1 + \frac{0.0078}{s} \quad 1 + \frac{0.0021}{s} \quad 1 + \frac{0.0038}{s} \right]$$

wherein the feedback gain value $F(s)$ comprises:
$F(s) = \text{diag}[1.5 \ 1.5 \ 1.5]$.

2. The acid concentration control method according to claim 1, further comprising:

adjusting the feedback gain value $F(s)$ of the acid concentration, and using it as a step imitation curve of the close-loop system; and adjusting the feedback gain value $F(s)$ of the acid concentration to complete design of multi-variable close-loop control system.

3. The acid concentration control method according to claim 2, further comprising:

simulating the close-loop control system, wherein a unit step response curve of the system is obtained, and system parameters are adjusted, including:

inputting parameter setting values, the transfer function matrix $K_p(s)$ of the pre-compensator, the transfer function matrix $K_c(s)$ of the dynamic compensator and the feedback gain value $F(s)$ of the acid concentration, wherein there is no overshoot in each main channel, and steady state error and response speed requirements of the system are met.

* * * * *